United States Patent [19]

Sanada

[11] Patent Number: 4,473,240
[45] Date of Patent: Sep. 25, 1984

[54] STEERING MECHANISM OF A ROAD VEHICLE

[75] Inventor: Yuichi Sanada, Tokyo, Japan

[73] Assignee: Nissan Motor Co., Ltd., Yokohama, Japan

[21] Appl. No.: 417,666

[22] Filed: Sep. 13, 1982

[30] Foreign Application Priority Data

Nov. 30, 1981 [JP] Japan ................................ 56-192392

[51] Int. Cl.³ ............................................. B62D 7/16
[52] U.S. Cl. .................................. 280/771; 280/95 R; 403/56; 403/74; 403/122; 403/128
[58] Field of Search ................. 280/771, 93, 96, 95 R, 280/95 A, 673, 674; 180/79, 154, 155, 158, 159, 160, 161, 162, 163; 403/56, 57, 74, 76, 124, 122, 125, 126, 128

[56] References Cited

U.S. PATENT DOCUMENTS

| | | | |
|---|---|---|---|
| 1,877,332 | 9/1932 | Laisne | 280/96 |
| 3,288,501 | 11/1966 | Ross et al. | 403/74 |
| 3,414,302 | 12/1968 | Priest | 403/125 |
| 3,791,457 | 2/1974 | Hanser et al. | 403/125 X |
| 3,967,907 | 7/1976 | Schmidt | 403/125 X |

FOREIGN PATENT DOCUMENTS

| | | |
|---|---|---|
| 1121947 | 8/1962 | Fed. Rep. of Germany . |
| 2752570 | 5/1979 | Fed. Rep. of Germany .... 280/95 R |
| 1001073 | 2/1952 | France . |
| 2505952 | 11/1982 | France . |
| 959892 | 6/1964 | United Kingdom . |
| 0591644 | 2/1978 | U.S.S.R. ............................ 280/95 R |

Primary Examiner—Joseph F. Peters, Jr.
Assistant Examiner—Mitchell J. Hill
Attorney, Agent, or Firm—Lane, Aitken & Kananen

[57] ABSTRACT

In a rack and pinion type steering mechanism of a vehicle having a steering wheel and road wheels steered by the steering wheel, a structure for effectively transmitting the movement of the rack member to two tie rods liked to the road wheels. A male member formed on an inside end of one tie rod is slidably received in a female member formed on an inside end of the other tie rod. The movably coupled male and female members are held through a bearing device in a holder which is fixed to the rack member.

10 Claims, 8 Drawing Figures

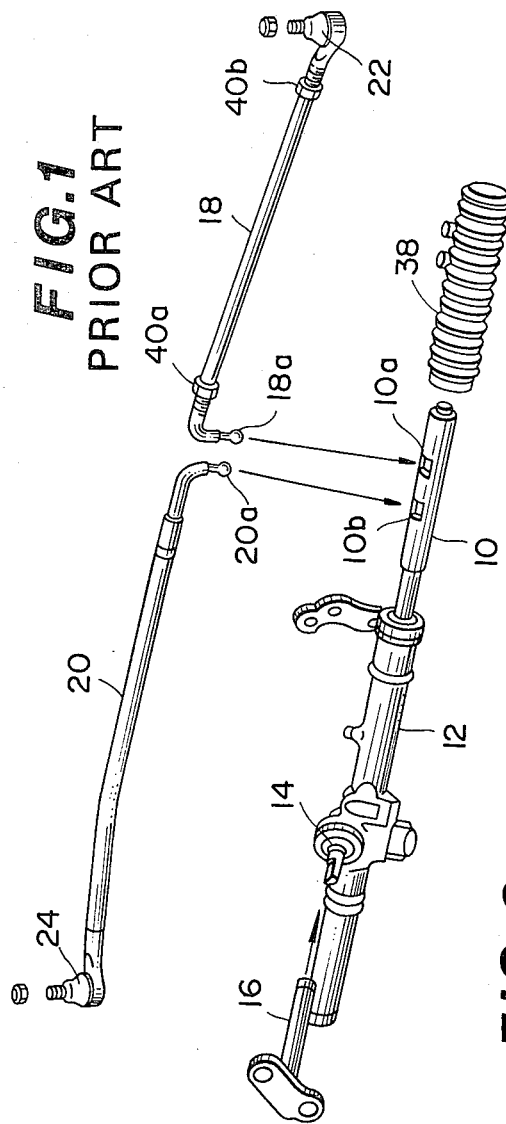
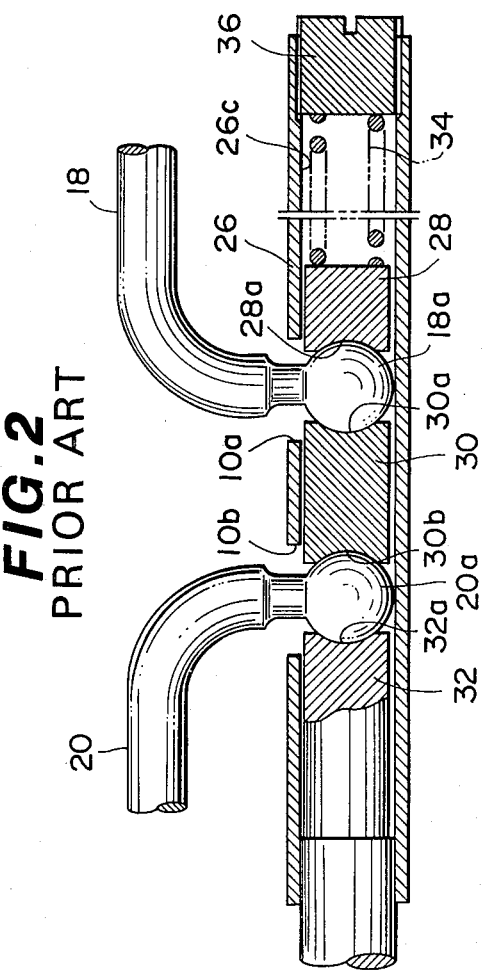

4,473,240

STEERING MECHANISM OF A ROAD VEHICLE

BACKGROUND OF THE INVENTION

The present inventon relates in general to a steering mechanism of a road vehicle, and more particularly, to a rack and pinion steering mechanism of a center take off type in which right and left tie rods linked respectively to right and left steered road wheels are pivotally connected at their inside ends to the rack member.

SUMMARY OF THE INVENTION

According to the present invention, there is provided a steering mechanism of a road vehicle which has a steering wheel and rod wheels steered by the steering wheel. The steering mechanism comprises a rack and pinion device including a rack member which is longitudinally movable in response to operation of the steering wheel; first and second tie rods which are respectively connected through respective knuckle means to the steered road wheels, the first and second tie rods having respective inside ends near the leading end of the rack member; a male member integrally mounted on the inside end of the first tie rod; a female member integrally mounted on the inside end of the second tie rod, the male member being engaged with the female member in a ball joint connection manner to permit a relative universal movement therebetween; a bearing device which bears the engaged male and female members permitting their universal movements relative to the bearing device; and a holder which tightly holds therein the bearing device and is fixed to the leading end of the rack member thereby to transmit the movement of the rack member to the first and second tie rods through the bearing device.

BRIEF DESCRIPTION OF THE DRAWINGS

Objects and advantages of the present invention will become clear from the following description when taken in conjunction with the accompanying drawings, in which:

FIG. 1 is an exploded view of a conventional rack and pinion type steering mechanism;

FIG. 2 is a sectional view of an essential portion of the conventional mechanism of FIG. 1;

DESCRIPTION OF THE PRIOR ART

Figure 3:
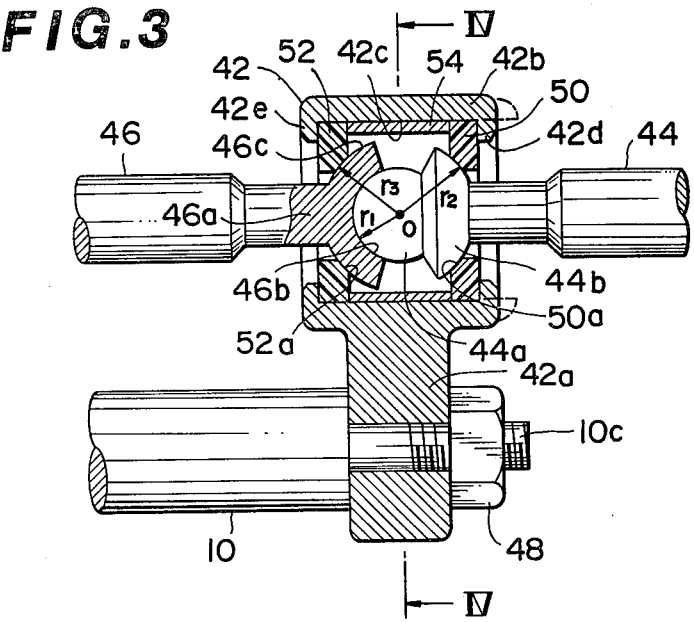
FIG. 3 is a sectional view of an essential portion of a rack and pinion type steering mechanism of a first embodiment of the present invention.

Prior to describing the invention, a conventional rack and pinion type steering mechanism will be described with reference to FIGS. 1 and 2 in order to clarify the invention.

In the drawings, numeral 10 denotes a rack member which is telescopically received in a tubular housing 12 which is secured to a vehicle body (not shown). The rack member 10 is formed, at a portion thereof received in the housing 12, with a rack proper which is meshed with a pinion 14 which is rotatably mounted on the housing 12. The pinion 14 connects a steering shaft 16 which extends to a vehicle cabin to mount thereon a steering wheel (not shown).

A right tie rod 18 is associated with a right front road wheel, while a left tie rod 20 is associated with a left front road wheel. The tie rods 18 and 20 are provided at their outside ends with respective knuckle means, such as ball joints 22 and 24, which are connected to the corresponding road wheels. As is shown in the drawings, the inside ends of the tie rods 18 and 20 are bent at generally right angles and formed with respective spherical portions 18a and 20a. The spherical portions 18a and 20a are positioned or received in the respective openings 10a and 10b formed in the projected end portion of the rack member 10.

As is shown by FIG. 2, the projected end portion of the rack member 10 comprises a tube 26 having therein a cylindrical chamber 26c which is merged with the openings 10a and 10b. Within the chamber 26c are movably received first, second and third supporters 28, 30 and 32 by which the spherical portions 18a and 20a of the tie rods 18 and 20 are nipped respectively, in a manner as shown. The supports 28, 30 and 32 are formed, at an axial end or ends thereof so as to be engageable with the corresponding spherical portions 18a and 20a, with concave surfaces 28a, 30a, 30b and 32a which are formed to match with the convex surfaces of the corresponding spherical portions 18a and 20a. A spring 34 is compressed between the supporter 28 and a plug member 36 to bias the supporters 28, 30 and 32 leftward in FIG. 2 to assure a ball joint connection between each spherical portion 18a or 20a of the tie rods 18 and 20 and the rack member 10. Usually, the projected end portion of the rack member 10 is covered by a boot 38. The tie rod 18 is equipped with an adjustor 40a, 40b by which the length of the tie rod 18 is adjustable.

When, in operation, the steering wheel (not shown) is turned clockwise, thus turning the steering shaft 16 and thus the pinion in the same direction, the rack member 10 is moved leftward in FIG. 1. The tie rods 18 and 20 are thus moved leftward thereby steering the front road wheels rightwards through steering knuckles (not shown). Similar to the above, when the steering wheel is turned counterclockwise, the road wheels are steered leftwards.

However, the above-mentioned type conventional steering mechanism has a weak point in transmitting the steering force from the steering wheel to the steered road wheels. It has been revealed that the ball joint connection between each tie rod 18 or 20 and the rack member 10 tends to produce a remarkable bending moment applied to the tie rods 18 and 20 upon steering thereby disturbing a smooth transmittal of force from the rack member 10 to the tie rods 18 and 20. In fact, satisfactory steering responsiveness and steering stability have not been expected from such conventional mechanism. Although such drawback may be solved when preparing dimensionally thicker or mechanically stronger tie rods, this measure induces a high cost production of the mechanism.

DESCRIPTION OF THE INVENTION

Therefore, an essential object of the present invention is to solve the above-mentioned drawback encountered in the conventional rack and pinion type steering mechanism.

Figure 4:
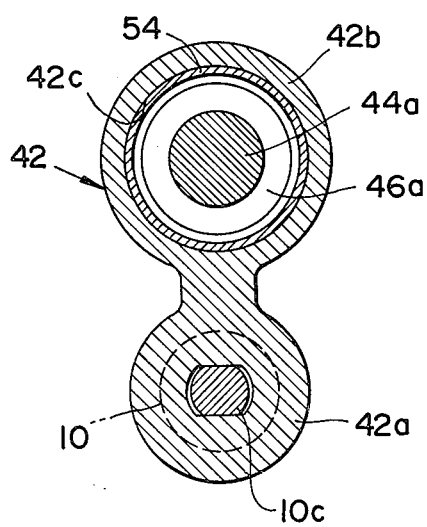
FIG. 4 is a sectioned view taken along the line IV—IV of FIG. 3.

Referring to FIGS. 3 and 4, there is shown a first embodiment of the present invention. In the drawings, the projected end portion of the above-mentioned type rack member is denoted by numeral 10. The projected end portion 10 of the rack member is integrally formed with a threaded bolt 10c which has flat opposed sides as will be seen from FIG. 4.

Secured to the bolt 10c is a holder 42 by which the right and left tie rods 44 and 46 are pivotally connected in a manner as will be described hereinafter. The holder 42 has an extension 42a with a bore through which the bolt 10c of the rack member 10 passes. The extension 42a is secured to the rack member 10 by a nut 48 engaged with the threaded bolt 10c. The holder 42 is formed at its holding portion 42b with a cylindrical through bore 42c which extends in a direction parallel with the axis of the rack member 10. The bore 42c is formed at its both ends with inwardly extending flanges 42d and 42e as is seen from FIG. 3. As will become clear as the description proceeds, the flange 42d is formed by bending or crimping the corresponding end of the holding portion 42b. For facilitation of the crimping, the end of the holding portion 42b is formed with a plurality of slits. Similar to the aforementioned conventional mechanism, the right and left tie rods 44 and 46 are provided at their outside ends with respective ball joints (not shown) which are connected to the corresponding right and left steered road wheels.

As is seen from FIG. 3, the inside ends of the tie rods 44 and 46 are housed in the bore 42c of the holder 42 and cooperate with each other to provide a so-called ball joint connection therebetween.

The end of the right tie rod 44 is formed with a male member which consists of a first spherical portion 44a of radius $r_1$ and a second spherical portion 44b of radius $r_2$ which are united to have a common center 0 on the axis of the tie rod 44. As shown, the first spherical portion 44a is mounted on the second spherical portion 44b to project toward the left tie rod 46, and the spherical surface of the second spherical portion 44b faces toward the right tie rod 44.

The inside end of the left tie rod 46 is formed with a female member 46a which comprises a concave surface 46b of radius $r_1$ and a convex surface 46c of radius $r_3$ which are formed to have a common center (0). Upon assembly, the first spherical portion 44a of the right tie rod 44 is universally movably received in the concave surface 46b of the female member of the left tie rod 46, as is seen from FIG. 3.

A first annular bearing 50 is mounted in the bore 42c of the holder 42 to bear the second spherical portion 44b. For this purpose, the bearing 50 is formed, at its portion engageable with the second spherical portion 44b, with a concave surface 50a of radius $r_2$. A second annular bearing 52 is mounted also in the bore 42c of the holder 42 to bear the female member 46a of the left tie rod 46. The second bearing 52 is formed, at its portion engageable with the convex surface 46c, with a concave surface 52a of radius $r_3$. Preferably, such bearings 50 and 52 are constructed of wear-resistant materials, such as commercially available under the trademark "NYLON", and sintered alloy. Designated by numeral 54 is a spacer for keeping the distance between the bearings 50 and 52 constant.

Now, if desired, suitable lubricant sheets may be employed interposed between mutually engageable members, for example, between the bearing 50 and the second spherical portion 44b of the right tie rod 44. With such lubricant sheets, the universal movement between the right and left tie rods 44 and 46 is much more improved.

In the following, an assembling process will be described with reference to the drawings.

First of all, a bearing device comprises the first bearing section 50 loosely slideably located on the right tie rod 44 with its concave surface 50a facing toward the second spherical portion 44b of the rod 44, and the second bearing section 52 loosely, slideably located on the left tie rod 46 with its concave surface 52a facing toward the convex surface 46c of the left tie rod female member 46a. Then, the male member and the female member of the respective right and left tie rods 44 and 46 are inserted into the bore 42c of the holder 42 from the opposed open ends of the holder 42 to mate the first spherical portion 44a of the male member with the concave surface 46b of the female member. Prior to this process, the spacer 54 has been inserted into the bore 42c of the holder 42.

Then, as is seen from FIG. 3, the flange 42d of the holder 42 is bent or crimped inwardly, by a suitable rolling machine, from the position indicated by a phantom line to the position indicated by a solid line. With this crimping, the male and female members of the respective right and left tie rods 44 and 46 are held by the holder 42 permitting relative universal movement therebetween.

The holder 42 is then connected with the rack member 10 by inserting the bolt 10c of the rack member 10 into the bore of the holder extension 42a and engaging the nut 48 with the threaded bolt 10c.

When, in operation, the steering wheel is turned clockwise or counterclockwise, the rack member 10 and thus the right and left tie rods 44 and 46 are moved rightward or leftward to FIG. 3. During this operation, the angles between the axis of the rack member 10 and the axes of the right and left tie rods 44 and 46 change in accordance with the angles for which the steered wheels turn. The change of the angles between the rack member 10 and the tie rods 44 and 46 is smoothly carried by the universally movable connection between the male and female members of the right and left tie rods 44 and 46.

Figure 5:
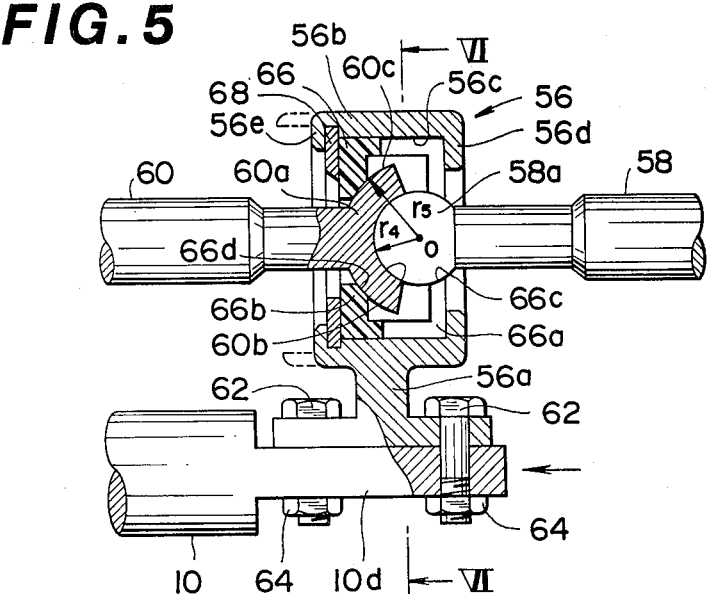
FIG. 5 is a view similar to FIG. 3, but showing a second embodiment of the present invention.
Figure 7:
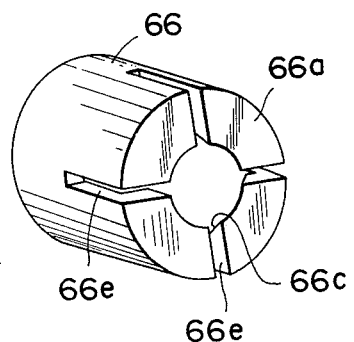
FIG. 7 is a perspective view of a bearing employed in the second embodiment.

Referring to FIGS. 5 and 7, there is shown a second embodiment of the present invention. As will become clear as the description proceeds, the male and female members of the right and left tie rods are borne by a single bearing member 66 which is held in the holder.

Figure 6:
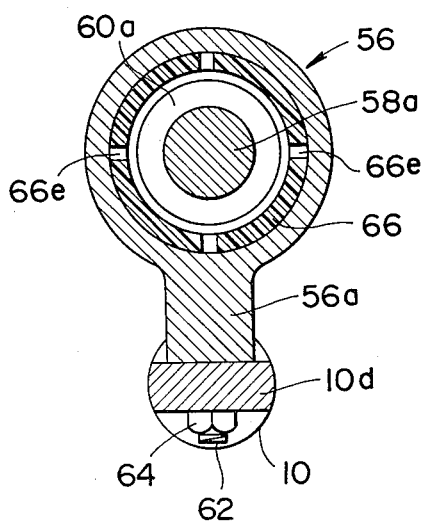
FIG. 6 is a sectioned view taken along the line VI—VI of FIG. 5.

In the drawings, the projected end portion of the rack member is denoted by numeral 10. The projected end portion 10 is integrally formed with an extension 10d which has flat opposed sides as will be seen from FIG. 6.

Secured to the rack member extension 10d is a holder 56 by which the right and left tie rods 58 and 60 are pivotally connected. The holder 56 has an extension 56a which is secured to the rack member extension 10d by means of bolts 62 and nut 64. The holder 56 is formed at its holding portion 56b with a through bore 56c which extends in a direction parallel with the axis of the rack member 10. The bore 56c is formed at its both ends with inwardly extending flanges 56d and 56e as is seen from FIG. 5. As will become clear as the description proceeds, the flange 56e is formed by bending or crimping the corresponding end of the holding portion 56b. For facilitation of the crimping, the end of the holding portion 56b is formed with a plurality of slits.

As is seen from FIG. 5, the inside ends of the tie rods 58 and 60 are housed in the bore 56c of the holder 56 and cooperate with each other to provide a so-called ball joint connection therebetween.

The end of the right tie rod 58 is formed with a male member consisting of a spherical portion 58a of radius $r_4$, the center 0 of the spherical portion 58a being on the axis of the tie rod 58.

The inside end of the left tie rod 60 is formed with a female member 60a which comprises a concave surface 60b of radius $r_4$ and a convex surface 60c of radius $r_5$ which are formed to have a common center (0) on the axis of the left the tie rod 60. Upon assembly, the spherical portion 58a of the right tie rod 58 is slidably received in the concave surface 60b of the left tie rod female member 60a.

A single bearing member 66 is employed in this second embodiment for bearing the above-mentioned male and female members 58a and 60a in a manner as will be described hereinnext.

The bearing member 66 is constructed of, for example, a wear-resistant plastics, such as commercially available under the trademark "NYLON" and is of a hollow cylindrical shape having perforated circular end walls 66a and 66b. As is seen from FIG. 5, the bearing member 66 is tightly housed in the holder 56, and the engaging male and female members 58a and 60a are held in the bearing member 66. For this purpose, one perforated circular end wall 66a is formed at its inside portion with a concave surface 66c of radius $r_4$, and the other perforated circular end wall 66b is formed at its inside portion with a concave surface 66d of radius $r_5$. As is seen from FIG. 7, the end wall 66a of the bearing member 66 is formed with four axially extending slits 66e in order to have a desired resiliency at the slit portions. Designated by numeral 68 (see FIG. 5) is a ring plate for assuredly holding the bearing member 66 in the holder 56.

In the following, an assembling process will be described with reference to the drawings.

First of all, the holder 56 is loosely slideably located on the right tie rod 58. With the male and female members being engaged, the bearing member 66 is loosely slid on the left tie rod 60 from the left end (not shown) of the same with slit end wall 66a facing toward the convex surface 60c of the female member 60a. When the slit end wall 66a of the bearing member 66 comes to contact with the convex surface 60c of the female member 60a, a stronger force is applied to the bearing member 66 to cause the slit end wall 66a to get over the female member 60a and the male member 58a. With this process, the engaging male and female members 58a and the 60a are pivotally received in the bearing member 66.

Then, the bearing member 66 with the temporarily assembled male and female members is received in the bore 56c of the holder 56, and the ring plate 68 is put in the bore 56c. Then, the slit end of the holding portion 56b of the holder 56 is bent or crimped inwardly, by a suitable rolling machine, from the position indicated by a phantom line to the position indicated by a solid line.

The holder 56 is then connected with the rack member 10 by bolting the extension 56a thereof to the rack member extension 10d.

Figure 8:
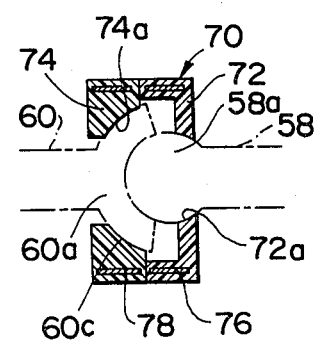
FIG. 8 is a sectional view of another bearing which is employable in the second embodiment.

FIG. 8 shows a separable bearing member 70 which is employable in the second embodiment as a substitute for the bearing member 66. The bearing member 70 comprises two annular bearings 72 and 74 which are coaxially arranged and contact each other. The bearing 72 is formed with a concave surface 72a which receives thereon the spherical portion 58a of the right tie rod 58. The other bearing 74 is formed with a concave surface 74a which receives thereon the convex surface 60c of the left tie rod female member 60a. Designated by numeral 76 and 78 are reinforcing rings which are embedded in the bearings 72 and 74. Usage of such a separable or dividable bearing member 70 facilitates the assembling of the tie rods 58 and 60.

The followings are advantageous constructional features possessed by the invention which are not applied to the above-mentioned conventional rack and pinion type steering mechanism.

First, in the invention, the right and left tie rods (44 and 46 in FIG. 3, 58 and 60 in FIG. 5) are directly engaged with each other at their inside ends, unlike the case of the conventional mechanism in which the connection between the tie rods 18 and 20 is made with interpositioning of the supporter 30 (see FIG. 2).

Second, in the invention, the universally movable connecting portions (or the engaged male and female members) of the tie rods are positioned on a line of action of the steering force transmitted to the tie rods. In case of the conventional one, the corresponding portions of the tie rods 18 and 20 are positioned apart from the line of action of the transmitting force.

With these advantageous features, the above-mentioned undesirable phenomenon encountered in the conventional mechanism does not occur. Thus, the steering responsiveness and the steering stability are achieved in a satisfactory manner in accordance with the present invention.

What is claimed is:

1. A steering mechanism of a road vehicle having a steering wheel and road wheels steered by the steering wheel, comprising:
   a rack and pinion device including a rack member which is longitudinally movable in response to operation of a steering wheel;
   first and second tie rods which are respectively connected through respective knuckle means to said steered road wheels, said first and second tie rods having respective inside ends near the leading end of said rack member;
   a male member integrally mounted on the inside end of said first tie rod;
   a female member integrally mounted on the inside end of said second tie rod, said male member being engaged with said female member in a ball joint connection manner to permit a relative universal movement therebetween;
   a bearing device which supports the engaged male and female members in a manner permitting their universal movement relative to said bearing device; and
   a holder which tightly holds therein said bearing device and is fixed to the leading end of said rack member thereby to transmit the movement of said rack member to said first and second tie rods through said bearing device.

2. A steering mechanism as claimed in claim 1, in which said male member comprises a spherical portion of a first given radius, and in which said female member comprises a concave surface of said first given radius, said spherical portion of the male member being universally movably received in said concave surface of said female member.

3. A steering mechanism as claimed in claim 2, in which said male and female members are respectively formed with spherical portions which are borne by said bearing device.

4. A steering mechanism as claimed in claim 3, in which said bearing device comprises a hollow cylindrical member having perforated circular end walls, said member having, at the inside surfaces of said end walls, respective concave surfaces which bear the respective spherical portions of said male and female members when said male and female members are received in the hollow cylindrical member of said bearing device.

5. A steering mechanism as claimed in claim 4, in which the end wall of said hollow cylindrical member which is associated with said male member is formed with axially extending slits.

6. A steering mechanism as claimed in claim 1, in which said bearing device is divided into two bearing sections, one of which supports said male member, and the other of which supports said female member.

7. A steering mechanism as claimed in claim 6, in which the divided two bearing sections of said bearing device are in contact with each other.

8. A steering mechanism as claimed in claim 6, in which the divided two bearing sections of said bearing device are spaced apart from each other by a predetermined distance by means of a spacer disposed therebetween.

9. A steering mechanism as claimed in claim 8, in which said male member further comprises another spherical portion which is formed to have the same center as said spherical portion of the first given radius, said another spherical portion having a convex surface which is borne by one of the bearing sections of the bearing device.

10. A steering mechanisms as claimed in claim 7, in which each of said two bearing sections of said bearing device is reinforced by a ring embedded therein.

* * * * *